United States Patent [19]
Flawn

[11] Patent Number: 5,572,217
[45] Date of Patent: Nov. 5, 1996

[54] COMPASS

[76] Inventor: Brian J. Flawn, 61 High Road., Berea, Durban, Natal Province, South Africa

[21] Appl. No.: 253,093

[22] Filed: Jun. 2, 1994

[30] Foreign Application Priority Data

Jun. 4, 1993 [ZA] South Africa ............................ 93/3951

[51] Int. Cl.⁶ .............................. H04B 7/185; G01S 5/02
[52] U.S. Cl. ............................................................ 342/357
[58] Field of Search ................................... 342/357, 419; 455/12.1

[56] References Cited

U.S. PATENT DOCUMENTS 5,146,231  9/1992  Ghaem et al. ........................... 342/419
5,266,958  11/1993  Durboraw, III ......................... 342/357

*Primary Examiner*—Theodore M. Blum
*Attorney, Agent, or Firm*—Clifford W. Browning; Woodard, Emhardt, Naughton Moriarty & McNett

[57] ABSTRACT

A compass comprising a signal receiver having an antenna unit that can be fixedly mounted on an object on which the compass is to be used, the antenna unit permitting information relating to the direction from which a signal is picked-up by it to be calculated. By communicating with satellites within the GPS satellite network and utilizing the information incorporated in signals transmitted by such satellites, together with the direction information referred to above, a processor permits the calculation of the direction of a heading marker relative to the direction north, thus using the above information for compass applications.

14 Claims, 1 Drawing Sheet

COMPASS

This invention relates to a compass.

BACKGROUND OF THE INVENTION

A compass is conventionally used to determine a direction of travel or to determine the bearing of, for example, an object relative to a fixed or moving point. As such, a compass includes a marker, herein referred to as a heading marker, which will point in a direction of travel, for one application of the compass, and which is pointed towards an object for which a bearing is required, for the other application of the compass. A compass also includes means to determine the direction of the heading marker with respect to a predetermined fixed direction, usually north.

Known compasses, including the above features, of which the Applicant is aware, include magnetic compasses, fluxgate-type compasses, gyroscope-type compasses, and the like. All these compasses suffer from inherent inaccuracies in different situations which are well known and which are not explained in further detail herein.

Since the location of a global positioning system (GPS) satellite network in orbit around the earth it has become possible to determine the location of objects or persons on the earth by communication between the satellites and GPS receiver modules carried by objects or persons. When used in association with moving objects and by utilizing position information obtained at intervals, a direction of travel can be determined, the GPS satellite network thus being used for a compass-type application. It will be understood that the compass-type application can only apply in association with moving objects and that the above principles cannot assist to provide a bearing for a distant object or to provide compass information on a stationary craft, or the like. It can also only provide for a direction of travel and not the direction of heading of an object or craft, as the actual direction of motion of a craft may not coincide with the heading of the craft.

Furthermore, U.S. Pat. No. 4,881,080 (United States of America (Navy)) proposes the use of two spaced apart antennae or GPS receiver modules on a ship, or the like, thus providing for the positions of the modules to be determined, which in turn provide heading and compass information. Accurate results clearly can only be obtained if the modules are spaced sufficiently far apart, both modules use the same satellites to prevent a difference in dilution of precision and position fixes are not interrupted due to insufficient satellites being available. This compass arrangement is not practical for most applications of conventional compasses, e.g. on smaller craft or for hand held applications. Also, due to the accurate measurements required on installation, it cannot be readily transferred from craft to craft.

U.S. Pat. No. 5,146,321 (Motorola) provides an improved system to the above but requires the manipulation of an antenna for its operation and this required manipulation creates a major problem, particularly when the system is used on moving objects where a continuous compass reading is required. A further major drawback of this system is that any change of attitude of a craft or object on which the system is used (roll or pitch), will seriously affect the accuracy of a compass reading provided.

SUMMARY OF THE INVENTION

Accordingly, it is an object of this invention to provide a compass that utilizes the information provided by the GPS satellite network via a GPS receiver module, or the like, which does not suffer from the disadvantages and problems associated with the known devices and systems as referred to above.

Although the present invention refers specifically to the employment of signals transmitted by the known GPS satellite network, it must be appreciated that if a further satellite network for carrying out the same or similar functions is placed in orbit around the earth, that signals transmitted by the new network could be similarly employed.

The information that can be obtained from a GPS satellite network includes information relating to the position of the GPS receiver module with which it can communicate and, in addition, information relating to the true azimuth and elevation level of satellites within the network relative to the GPS receiver module with which it can communicate.

According to the invention there is provided a compass, which comprises a signal receiver that can receive signals transmitted from global positioning system (GPS) satellites, the receiver having an antenna that, in use, is fixedly positioned with respect to a heading marker and that permits information representing the direction from which a GPS satellite signal is transmitted to it relative to the heading marker to be generated;

auxiliary processing means that can cooperate with the antenna for generating information representing the direction from which the GPS satellite signal is transmitted to the antenna relative to the heading marker; and primary processing means which can process signals received from a GPS satellite, extracting particularly the azimuth position information of the satellite and which can calculate the direction of the heading marker relative to the direction north by utilizing the information giving the direction from which a satellite signal is transmitted to the antenna of the signal receiver relative to the heading marker and the azimuth position information of the satellite.

The signal receiver typically is a GPS receiver module that can communicate with GPS satellites, although any other suitable signal receiver clearly also can be utilized.

The antenna preferably is a multi-element antenna unit of which each element can pick-up the same signal from one or more GPS satellite, and in association with which the auxiliary processing means can process signals picked up and thereby calculate the direction from which a GPS satellite signal is transmitted to it relative to the heading marker and generate a signal representing this information. In situations in which the antenna, or the object on which it is fixedly mounted, is exposed to tilting, the signals from at least two satellites must be picked up and processed to determine the direction from which one of the signals is transmitted to it relative to the heading marker. As such, the antenna may be a multi-element dipole antenna unit although other configuration antennas that may be suitable include a patch element-type antenna, a micro strip antenna, and the like.

The auxiliary processing means of the compass of the invention may be incorporated as part of the primary processing means.

The primary processing means may be of a type that is software controlled and that can process signals received from GPS satellites, for providing signals in a suitable form in which it can calculate the direction of the heading marker relative to the direction north. Clearly, the software utilized for this purpose is greatly variable and, as such, is not described and defined in any further detail herein. It will be understood that having the direction relative to north from which the signal is received by the signal receiver and the direction of the same signal relative to the heading marker, it is a simple calculation to determine the direction of the heading marker relative to the direction north and, as such, the device of the invention can fulfil the purpose of a compass.

The antenna used may be either active or passive and may also incorporate any pre-amplifier, filters, and the like, as well as any processing unit that it may require in order to fulfil its required function.

Further according to the invention, the compass may include a support body which incorporates the heading marker and that supports the signal receiver including the primary and auxiliary processing means thereon. Alternatively, the compass may include a support body that supports the antenna, permitting the antenna to be fixedly mounted remote from the primary and auxiliary processing means.

Still further according to the invention, the compass may include display means that is operatively connected to the primary processing means and that can display the direction of the heading marker with respect to the direction north. The display means may be a conventional head-up type display or, alternatively, may be a digital-type display.

The compass of the invention may be adapted for various different applications which may either be for applications on land, on seacraft, on aircraft, and the like, and also for various hand-held applications. Also, particularly the primary processing means of the compass may be interfaced with other secondary processing means such as auto-pilots, radars, and the like, permitting information associated with signals received from a GPS satellite to be utilized for calculating or processing additional information associated with such signals. As such, the compass of the invention can fulfil all the applications associated with conventional known compasses.

The exact features of the compass of the invention are greatly variable and the invention extends also to alternative configuration compasses which still incorporate the essential principles of the invention as defined, these principles essentially providing for means that can generate information in respect of the direction from which a GPS satellite signal is received by the signal receiver of the compass and means to process this information in order to calculate the direction of the heading marker using the direction information forming part of the signal received from a GPS satellite and providing details of the azimuth position of the satellite.

As the compass of the invention may be adapted to deal substantially simultaneously with signals received from different satellites, it is possible to confirm the direction of the heading marker calculated by it and also to repeat the processing of signals and information from a particular satellite substantially continuously for as long as required.

BRIEF DESCRIPTION OF THE DRAWING FIGURES

Further features of the compass of the invention, including the mode of operation thereof, are described in more detail hereinafter with reference to an example of the invention, illustrated by way of the accompanying diagrammatic drawings. In the drawings:

FIG. 1 illustrates schematically the configuration of a compass, in accordance with the invention; and FIG. 2 illustrates schematically in plan view the configuration of an antenna for use with the compass of FIG. 1.

DETAILED DESCRIPTION OF THE PREFERRED EMBODIMENT

Figure 1:
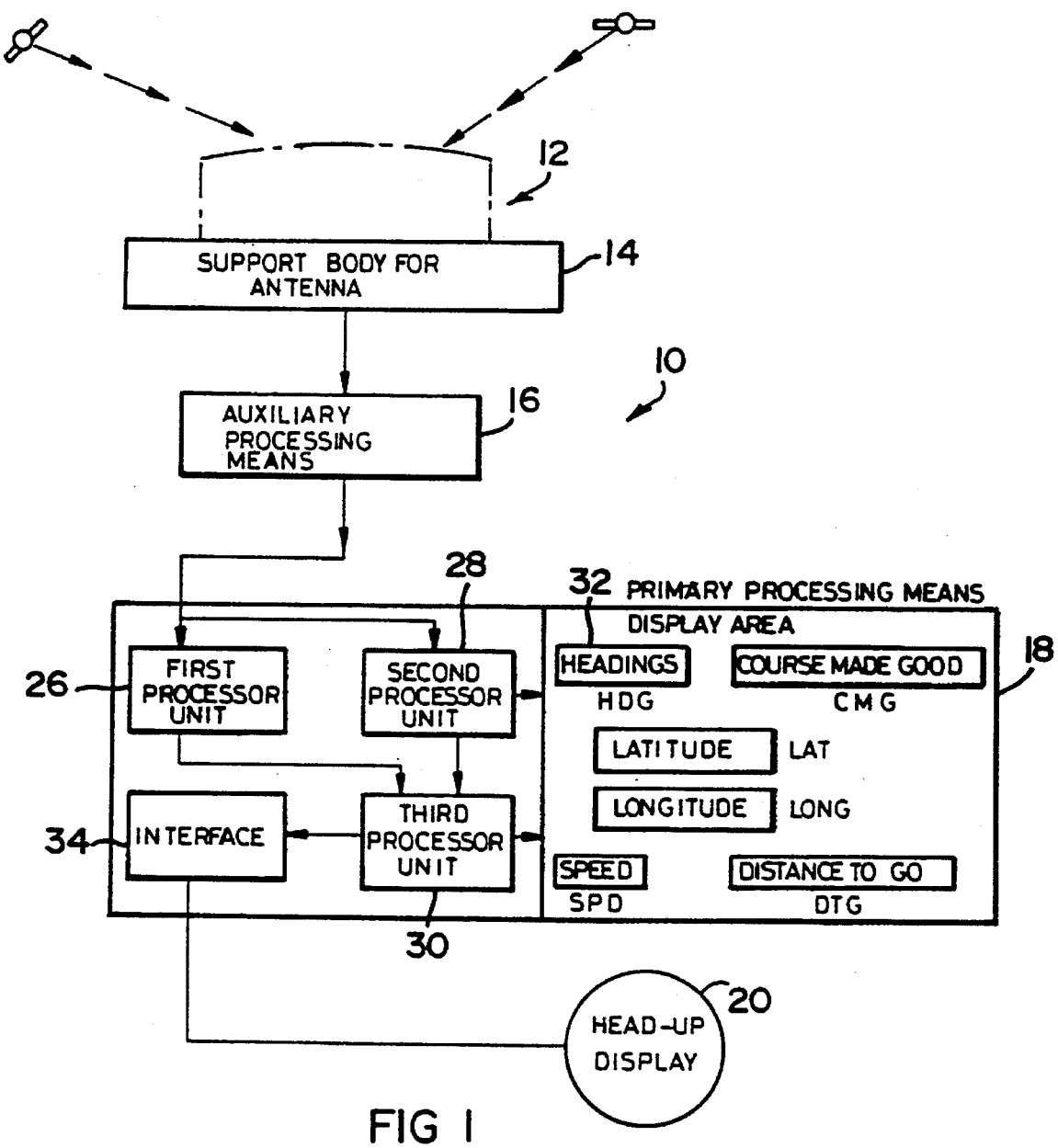

Referring to the drawings, a compass, in accordance with the invention, is designated generally by the reference numeral 10. The compass 10 as illustrated is described as a compass that is adapted particularly for navigation purposes on ships, and the like, in which it can indicate direction of travel. The compass 10 includes a direction finding antenna, generally indicated by the reference numeral 12, one possible embodiment of an antenna being shown in detail in FIG. 2 of the drawings. The antenna 12 is mounted on a support body 14 which can be fixedly mounted on an associated ship in a predetermined configuration with respect to a heading marker that indicates the ship's heading at any particular time. The compass 10 includes further an auxiliary processing means 16 that can cooperate with the antenna 12 for generating information representing the direction from which a GPS satellite signal is transmitted to the antenna relative to the heading marker and a primary processing means 18 that can process signals received from a GPS satellite, extracting particularly the azimuth position information of the satellite, and that can calculate the direction of the heading marker relative to the direction north by utilizing the information giving the direction from which a satellite signal is transmitted to the antenna relative to the heading marker and the azimuth position information of the satellite, the operation and further features of the primary processing means being described in more detail hereafter. The compass 10 includes still further a head-up display 20 which can display the direction of travel of a ship on which the compass is mounted at any particular time and/or to obtain the true bearing of distant objects.

Figure 2:
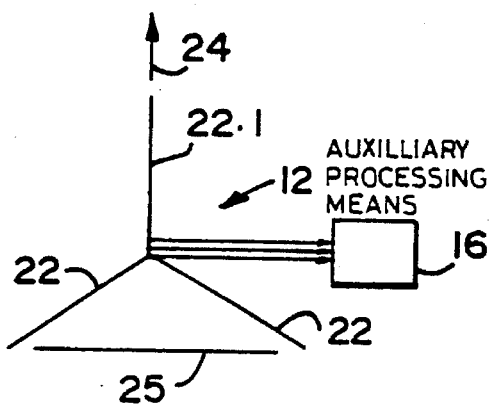

Referring particularly to FIG. 2 of the drawings, the antenna 12 is a dipole-type antenna having three antenna elements 22 that are disposed at 120° to one another as shown. The arrow 24 represents the heading marker referred to above and in the operative configuration of the antenna 12 as shown, the antenna element 22.1 is effectively aligned with the heading marker 24, thus providing a fixed relationship between the antenna 12 and the heading marker 24.

In practice, depending on the relative positions of satellites within a satellite network relative to the antenna 12, the signal strength of a particular signal picked-up from a satellite by the individual antenna elements 22 will differ, this information being transferred to the auxiliary processing means 16 in order to enable the calculation of the exact direction from which a signal is received by the antenna 12 with respect to the heading marker 24 and the generation of signals representing this information.

By utilizing this amplitude comparison technique as described, no combination of differing signal strength proportions will be repeated, other than every 180°. A sense element 25 therefore is provided in order to distinguish between signals received from different 180° ranges, thus ensuring that the correct angle of an incoming signal with respect to the heading marker 24 is determined. This sense element will be used on start-up only.

Particularly by processing signal information picked-up by the antenna from two satellites, true direction information can be computed, even if a craft on which an antenna is mounted is heavily tilted at any particular time. In this case, elevation information as provided by GPS satellites and as sensed by the antenna also is taken into account for determining the direction from which a signal is received with respect to the heading marker.

Referring again to FIG. 1 of the drawings also, the information generated by the auxiliary processing means 16, as well as the actual signals picked-up by the antenna 12 from particular satellites at any particular time, are transmitted to the primary processing means, the primary processing means including a first processor unit 26 which deals with the direction information generated by the processing means 16 in order to convert this information into a suitable form to enable the calculation of heading data as described hereafter. The actual signals received from a particular satellite is conveyed to a second processor unit 28 which extracts the azimuth and elevation information of the satellite from the ephemeris, both the processor units 26 and 28 communicating with a third processor unit 30 which will calculate the direction of the heading marker from the information provided to it, this heading information being displayed in digital form on a display segment of the processing means 18 in the display area 32 and also being displayed on the display 20, which is interfaced with the third processing unit 30 via an interface 34.

By way of example, by establishing that the angle between the heading marker 24 and the direction from which a signal is received by the antenna 12 of the compass 10 is, for example, 60° and by establishing from the actual signal received that the satellite that transmitted the signal is disposed at an angle of 120° with respect to the direction north, by simply subtracting 60° from 120° it will be established that the heading marker 24 is disposed at 60° from the direction north, which will mean essentially that the direction of travel of the ship on which the compass is located is 60° east of north. In practice, the information will be confirmed by picking up signals from other satellites within the network, while the process also will be continuously repeated by picking up sequential signals from particular satellites, which will thus continuously provide details as to the direction of travel of the ship on which the compass is located.

It will be understood that the exact configuration of the compass 10 is greatly variable and, particularly, the type of equipment used for forming the compass 10, the equipment used being determined particularly by the exact requirements of the compass 10. The compass clearly can be used on various other moving objects such as on motor vehicles, aircraft, and the like.

It must be understood further that the complete compass can be provided as a unit which incorporates the primary and auxiliary processing means as well as displays as described, the antenna 12 either forming a part of the unit where it is intended to be used for hand held purposes, or the like, or being separately provided in order to permit mounting in a suitable location on a vehicle or object on which the antenna is proposed to be used.

It is anticipated particularly that the primary processing means 18 as shown can form a part of a conventional GPS receiver module, the display segment of the module also providing for additional information to be displayed such as latitude and longitude information, "course made good" information, speed information, "distance to go" information, and the like. In order to facilitate the supply of this information, the module may be interfaced with any other equipment which can facilitate calculation of this information and the display thereof by the receiver module.

The compass can be used conventionally by providing a bearing of an object relative to a fixed or moving point by merely moving the compass so that the heading marker can be pointed to the object for which a bearing is required. The remaining operation of the compass 10 will hence be conventional as it will provide the specific direction of the heading marker with respect to the direction north and thus provide a bearing on the object for which this is required.

It is apparent that the compass 10 will be extremely accurate as it will not be affected by the movement of the vehicle on which it is mounted, or global positioning or altitude of the compass in its operative configuration, the compass 10 thus not being associated with the disadvantages that are commonly associated with known compasses.

I claim:

1. A compass which comprises a heading marker; a signal receiver for receiving signals transmitted from global positioning system (GPS) satellites, the receiver having an antenna that, in use, is fixedly positioned with respect to the heading marker and that permits information representing the direction from which a GPS satellite signal is transmitted to it relative to the heading marker to be generated; auxiliary processing means for cooperating with the antenna for generating the information representing the direction from which a GPS satellite signal is transmitted to the antenna relative to the heading marker; and primary processing means for processing signals received from a GPS satellite, extracting particularly the azimuth position information of the satellite and for calculating the direction of the heading marker relative to the direction north by utilizing the information giving the direction from which a satellite signal is transmitted to the antenna of the signal receiver relative to the heading marker and the azimuth position information of the satellite.

2. A compass as claimed in claim 1, in which the signal receiver is a GPS receiver module that can communicate with GPS satellites.

3. A compass as claimed in claim 2, in which the antenna is a multi-element antenna unit of which each element will pick-up the same signal from a GPS satellite, and in which the auxiliary processing means will process a signal so picked-up and thereby calculate the direction from which the GPS satellite signal is transmitted to it relative to the heading marker and generate a signal representing this information.

4. A compass as claimed in claim 3, in which the antenna is a multi-element dipole antenna.

5. A compass as claimed in claim 2, in which the antenna is a multi-element antenna unit of which each element will pick-up the same signal from different GPS satellites, and in which the auxiliary processing means will process at least two signals picked-up and thereby calculate the direction from which one of the signals is transmitted to it relative to the heading marker and generate a signal representing this information.

6. A compass as claimed in claim 5, in which the antenna is a multi-element dipole antenna.

7. A compass as claimed in claim 1, in which the auxiliary processing means is incorporated as part of the primary processing means.

8. A compass as claimed in claim 1, in which the primary processing means is of a type that is software controlled and that processes signals received from GPS satellites, for providing signals in a suitable form for calculating the direction of the heading marker relative to the direction north.

9. A compass as claimed in claim 1, which includes a support body that incorporates the heading marker and that supports the signal receiver including the primary and auxiliary processing means thereon.

10. A compass as claimed in claim 1, which includes a support body that supports the antenna, permitting the antenna to be fixedly mounted remote from the primary and auxiliary processing means.

11. A compass as claimed in claim 1, which includes display means that is operatively connected to the primary processing means for displaying the direction of the heading marker with respect to the direction north.

12. A compass as claimed in claim 11, in which the display means is a conventional head-up type display.

13. A compass as claimed in claim 11, in which the display means is a digital-type display.

14. A compass as claimed in claim 1, which includes interfacing means for interfacing the primary processing means with secondary processing means permitting signals received from a GPS satellite to be utilized for determining and displaying additional information including one or more of latitude and longitude information, "course made good" information, speed information and "distance to go" information.

* * * * *